US012283781B2

(12) United States Patent
Smentek et al.

(10) Patent No.: US 12,283,781 B2
(45) Date of Patent: Apr. 22, 2025

(54) GANGED COAXIAL CONNECTOR ASSEMBLY WITH AISG SIGNAL PATH

(71) Applicant: Outdoor Wireless Networks LLC, Claremont, NC (US)

(72) Inventors: David Smentek, Lockport, IL (US); John Brunner, Ramona, CA (US); Dale Moore, Murphy, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 442 days.

(21) Appl. No.: 17/729,342

(22) Filed: Apr. 26, 2022

(65) Prior Publication Data

US 2022/0368088 A1 Nov. 17, 2022

Related U.S. Application Data

(60) Provisional application No. 63/187,643, filed on May 12, 2021.

(51) Int. Cl.
*H01R 24/40* (2011.01)
*H01R 9/05* (2006.01)

(52) U.S. Cl.
CPC ............... *H01R 24/40* (2013.01); *H01R 9/05* (2013.01); *H01R 2201/02* (2013.01); *H01R 2201/24* (2013.01)

(58) Field of Classification Search
CPC ...... H01R 24/40; H01R 9/05; H01R 2201/02; H01R 2201/24; H01R 13/62933; H01R 13/6315
See application file for complete search history.

(56) References Cited

U.S. PATENT DOCUMENTS

| | | | | |
|---|---|---|---|---|
| 8,320,766 B2 * | 11/2012 | Truong | H04B 10/40 398/115 |
| 8,514,145 B2 * | 8/2013 | Le Sage | H01Q 1/246 343/702 |
| 8,634,823 B2 * | 1/2014 | Le Sage | H01Q 1/246 455/67.11 |
| 9,806,413 B1 * | 10/2017 | Chukka | H01Q 21/08 |
| 10,666,000 B2 * | 5/2020 | Zheng | H01R 9/05 |
| 10,985,454 B2 * | 4/2021 | Bisiules | H01Q 1/42 |
| 10,993,285 B2 * | 4/2021 | Mohr | H04W 92/12 |
| 2010/0113096 A1 * | 5/2010 | Seeor | H04B 17/318 455/562.1 |

(Continued)

FOREIGN PATENT DOCUMENTS

JP 2013017041 A 1/2013

OTHER PUBLICATIONS

International Preliminary Report on Patentability corresponding to PCT/US2022/026116; Issued Nov. 14, 2023 (8 pages).

(Continued)

*Primary Examiner* — Briggitte R. Hammond
(74) *Attorney, Agent, or Firm* — Myers Bigel, P.A.

(57) ABSTRACT

A ganged connector assembly includes: a housing; a plurality of first coaxial connectors mounted in the housing; a plurality of first coaxial cables, each attached to a respective one of the plurality of first coaxial connectors; and a second coaxial cable electrically connected with a first one of the first coaxial connectors, the second coaxial cable configured to transmit AISG signals to the first one of the first coaxial connectors.

13 Claims, 7 Drawing Sheets

(56) References Cited

U.S. PATENT DOCUMENTS

| | | | |
|---|---|---|---|
| 2013/0072058 A1 | 3/2013 | Le et al. | |
| 2013/0252478 A1 | 9/2013 | Le et al. | |
| 2014/0203983 A1* | 7/2014 | Lee | H01Q 1/246 343/766 |
| 2014/0242840 A1 | 8/2014 | Dang | |
| 2019/0312394 A1 | 10/2019 | Paynter et al. | |
| 2020/0021055 A1 | 1/2020 | Wu et al. | |

OTHER PUBLICATIONS

"International Search Report and Written Opinion corresponding to International Application No. PCT/US2022/026116 mailed Aug. 11, 2022".

* cited by examiner

GANGED COAXIAL CONNECTOR ASSEMBLY WITH AISG SIGNAL PATH

RELATED APPLICATION

The present application claims priority from and the benefit of U.S. Provisional Patent Application No. 63/187,643, filed May 12, 2021, the disclosure of which is hereby incorporated herein by reference in full.

FIELD OF THE INVENTION

The present invention relates generally to electrical cable connectors and, more particularly, to ganged connector assemblies.

BACKGROUND OF THE INVENTION

Coaxial cables are commonly utilized in RF communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Some coaxial connector interfaces utilize a retainer (often provided as a threaded coupling nut) that draws the connector interface pair into secure electro-mechanical engagement as the coupling nut, rotatably retained upon one connector, is threaded upon the other connector.

Alternatively, connection interfaces may be also provided with a blind mate characteristic to enable push-on interconnection, wherein physical access to the connector bodies is restricted and/or the interconnected portions are linked in a manner where precise alignment is difficult or not cost-effective (such as the connection between an antenna and a transceiver that are coupled together via a rail system or the like). To accommodate misalignment, a blind mate connector may be provided with lateral and/or longitudinal spring action, or "float," to accommodate a limited degree of insertion misalignment. Blind mated connectors may be particularly suitable for use in "ganged" connector arrangements, in which multiple connectors (for example, four or five connectors) are attached to each other and are mated to mating connectors simultaneously.

Examples of ganged coaxial connector assemblies are discussed in U.S. Patent Publication No. 2019/0312394 to Paynter, the disclosure of which is hereby incorporated herein by reference in full. Ganged connectors are shown therein with a common shell. Each individual "male" connector is sized to be able to "float" axially, angularly and radially relative to the shell. Also, each individual "male" connector engages a respective helical spring that also engages the shell. Although each connector can move relative to the shell to adjust during mating, compression in the spring can provide sufficient force that, once the male connector is mated, the male connector is maintained in position relative to the shell. The ganged male connectors are secured to the mating "female" connectors via a pivoting latch that captures a pin on gang of male connectors.

It may be desirable to develop additional concepts, solutions and applications for ganged coaxial connectors.

SUMMARY OF THE INVENTION

As a first aspect, embodiments of the invention are directed to a ganged connector assembly. The assembly comprises: a housing, a plurality of first coaxial connectors mounted in the housing; a plurality of first coaxial cables, each attached to a respective one of the plurality of first coaxial connectors; and a second coaxial cable electrically connected with a first one of the first coaxial connectors, the second coaxial cable configured to transmit AISG signals to the first one of the first coaxial connectors.

As a second aspect, embodiments of the invention are directed to a ganged connector assembly comprising: a housing, a plurality of first coaxial connectors mounted in the housing; a plurality of first coaxial cables, each attached to a respective one of the plurality of first coaxial connectors; and a second coaxial cable attached to a first one of the first coaxial connectors, the second coaxial cable configured to transmit AISG signals to the first one of the first coaxial connectors.

DETAILED DESCRIPTION OF THE INVENTION

Figure 1:
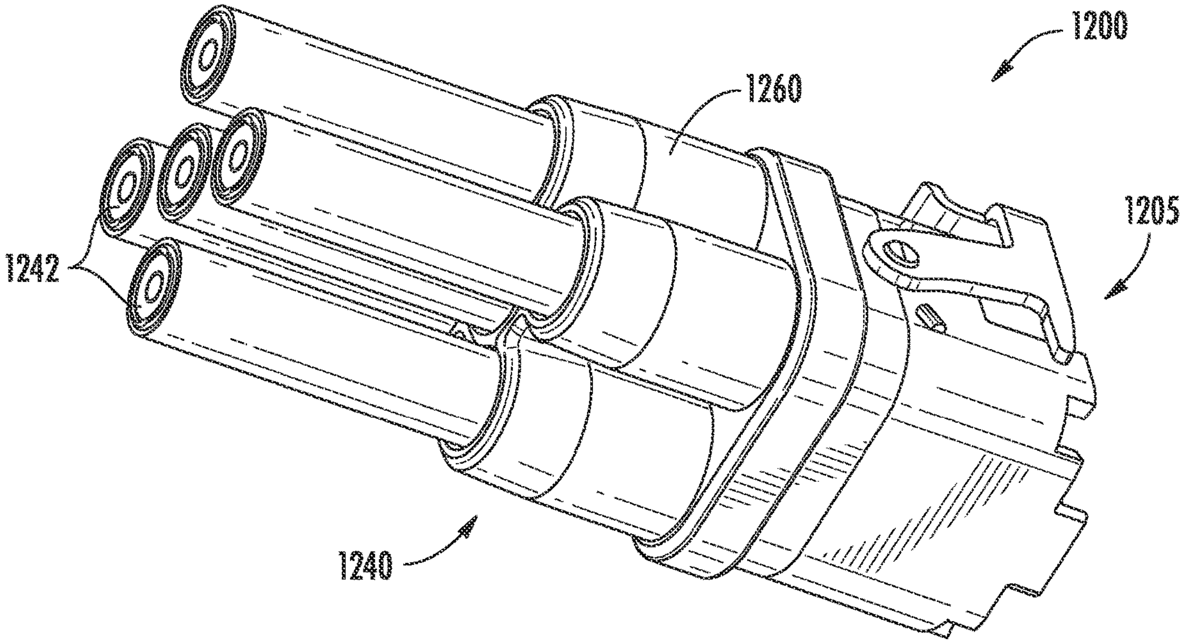
FIG. 1 is a perspective view of a prior assembly of mated ganged connectors.

The present invention is described with reference to the accompanying drawings. It will be appreciated that the present specification only describes a few example embodiments of the present invention and that the techniques described herein have applicability beyond the example embodiments described below.

Embodiments of the present invention have been described below with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed below can be combined in any way and/or combination with aspects or elements of other embodiments to provide a plurality of additional embodiments.

Figure 2:
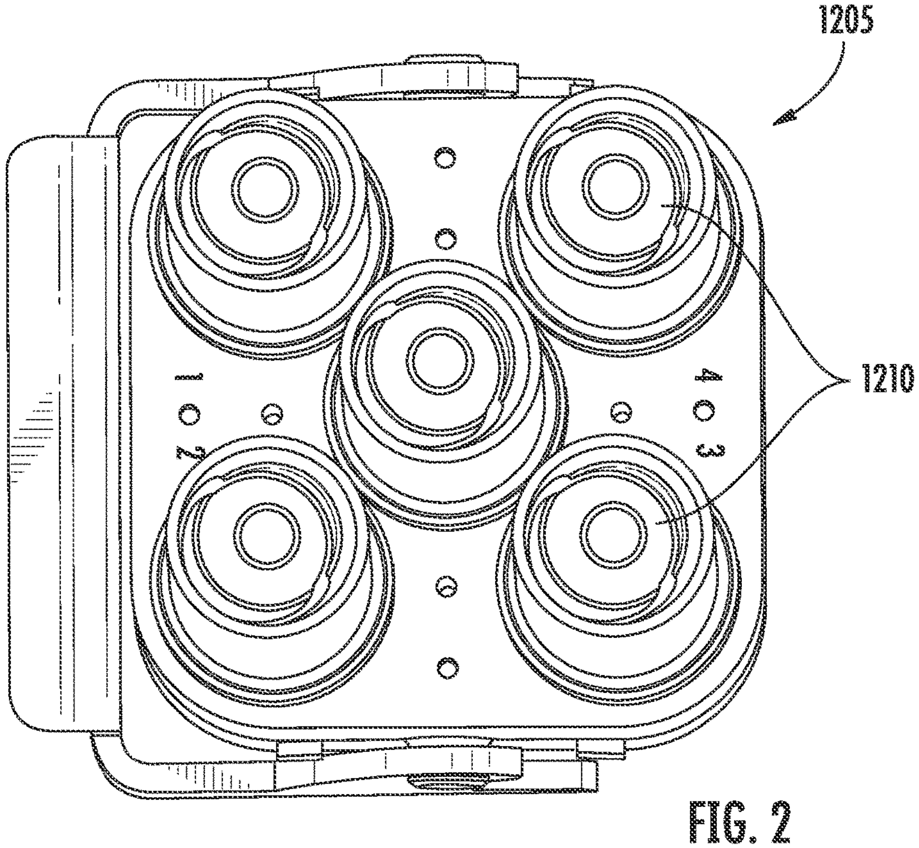
FIG. 2 is an end perspective view of the assembly of FIG. 1.
Figure 3:
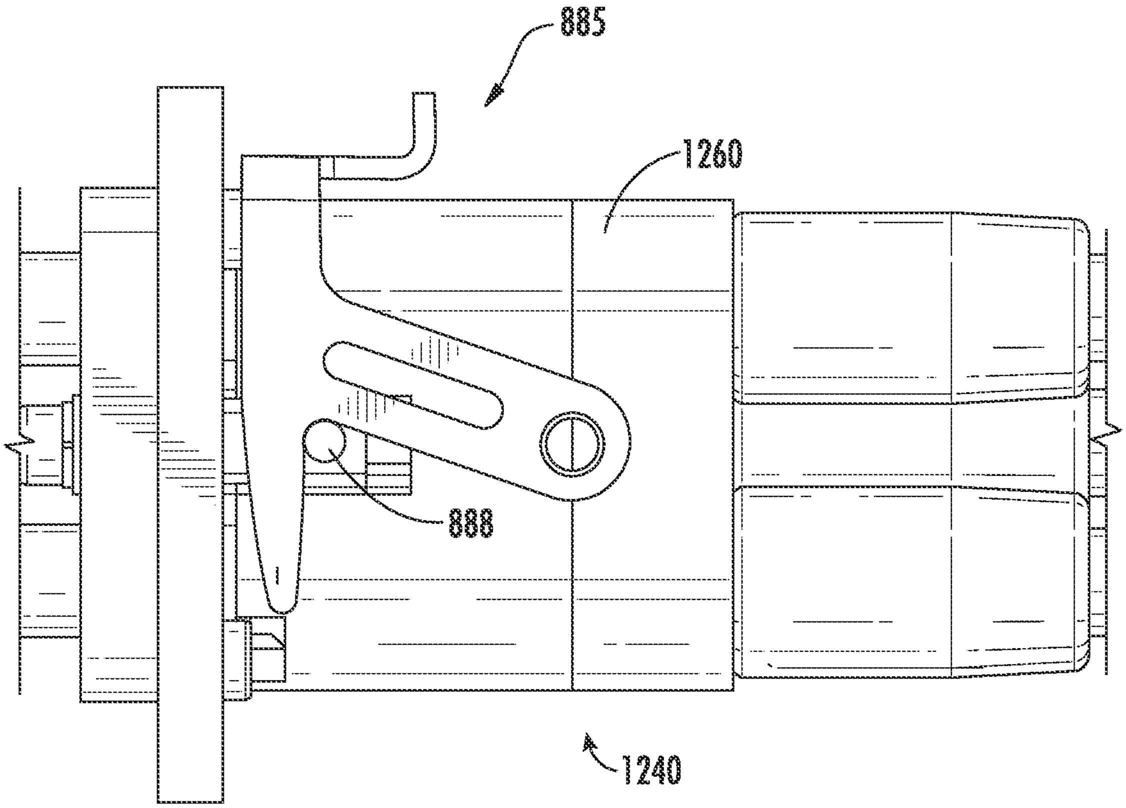
FIG. 3 is a side view of the assembly of FIG. 1 mated with a mating assembly and the latch engaged to secure the assemblies together.
Figure 4:
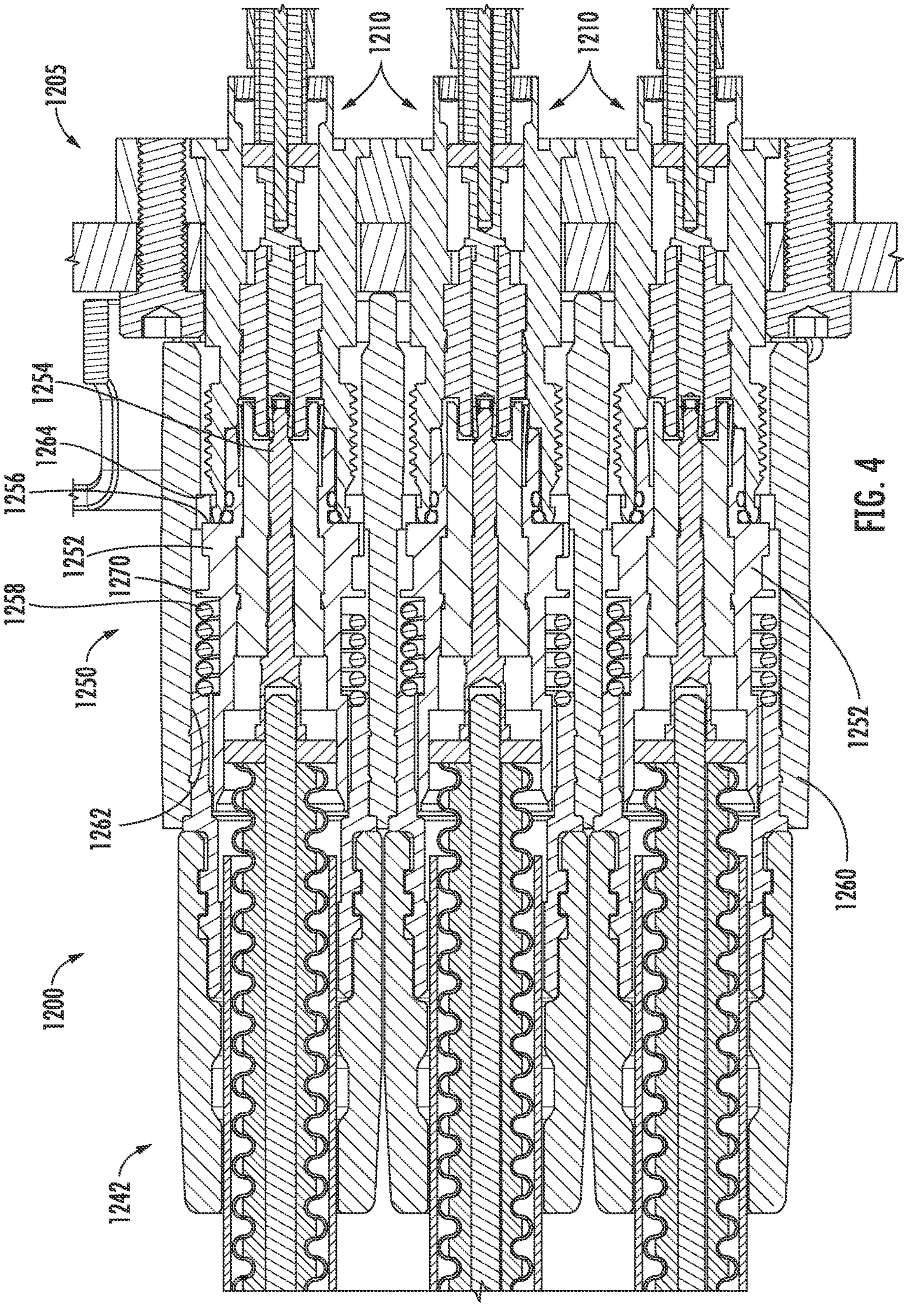
FIG. 4 is a section view of the assembly of FIG. 1 showing the springs employed to provide the individual connectors the ability to "float"— relative to the housing.

Referring now to the drawings, an example of a paired assembly of ganged connectors is shown in FIGS. 1-4. The paired assembly of connectors 1200 shown therein includes an equipment connector assembly 1205 with five connectors 1210 and a cable connector assembly 1240 with five connectors 1250 connected to five cables 1242. As shown in FIGS. 1-2 and 4, the connectors 1210 and 1250 are arranged in a cruciform pattern, with one of the connectors 1210, 1250 surrounded by four other connectors 1210, 1250 separated from each other by 90 degrees. As shown in FIG. 3, the assemblies 1205, 1240 can be secured with a latch 885 that is pivotally mounted to the assembly 1205 and engages a pin 888 on the assembly 1240.

Referring now to FIG. 4, it can be seen that the connectors 1250 of the cable-connector assembly 1240 reside in a shell 1260. Each of the connectors 1250 includes an outer connector body 1252 and an inner contact 1254 that mate with, respectively, an outer connector body 1212 and an inner contact 1214 of a mating connector 1210 of the equipment connector assembly 1205. FIG. 4 also illustrates that each outer connector body 1252 is encircled by a helical spring 1258 that extends between a shoulder 1262 in the shell 1260 and a flange 1270 on the outer connector body 1252. The spring 1258 remains in compression. A shoulder 1256 of the outer connector body 1252 is positioned to engage a second shoulder 1264 of the shell 1260 and provide a forward limit on the forward movement of the outer connector body 1252. There is also space radially outward of the outer connector body 1252 between it and the shell 1260. Thus, the connector 1250 has the ability to float axially, radially, and angularly relative to the shell 1260, which can enable each of the connectors 1250 to adjust its position individually as needed to mate with the connectors 1210 of assembly 1205. The compressed spring 1258 provides sufficient force on the shell 1260 and the connector 1250 to maintain the connector 1250 in position relative to the shell 1260 once the connector 1250 has adjusted its position during mating.

Figure 5:
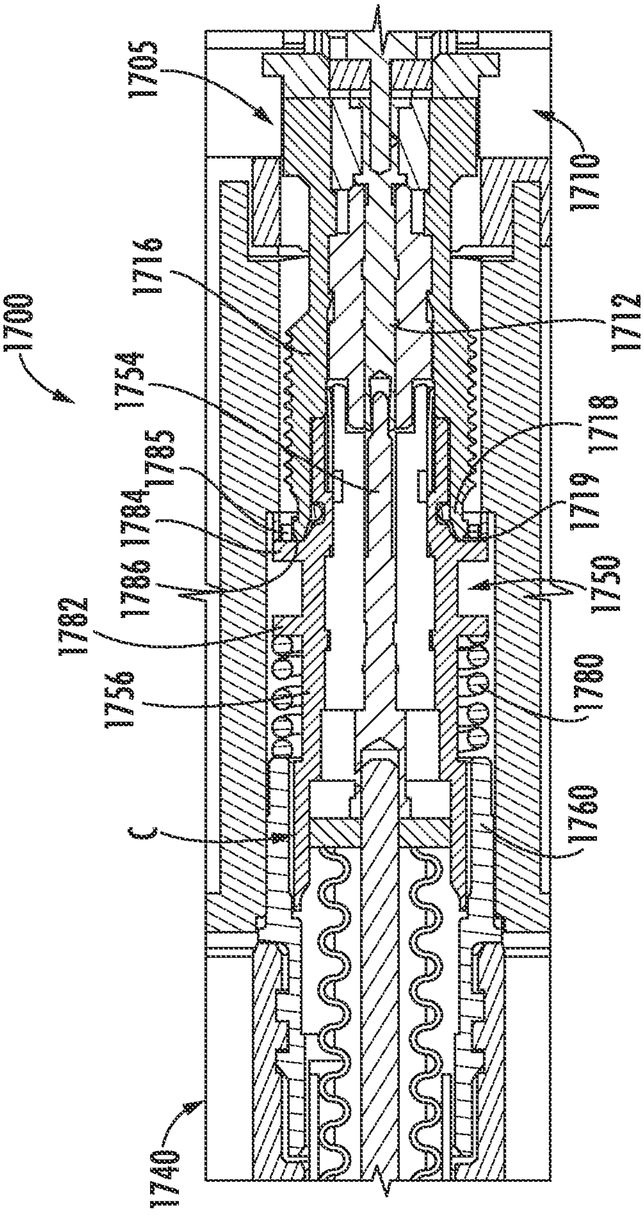
FIG. 5 is a section view of an alternative version of the assembly of FIG. 1 showing springs that provide the ability of the connectors to float.

FIG. 5 illustrates another embodiment of a ganged connector assembly 1700. The assembly 1700 is similar to the assembly 1200, with an equipment connector assembly 1705 having connectors 1710 mating with a cable connector assembly 1740 with connectors 1750 in a shell 1760. Springs 1780 provide the capacity for axial and radial adjustment of the outer connector body 1756 relative to the shell 1760 as discussed above. In this embodiment, the outer connector body 1756 has a radially-outward flange 1784 located forwardly of the flange 1782 (which captures the forward end of the spring 1780). The flange 1784 has a trepan groove 1786 in its forward surface (a projection 1785 is located radially outward of the groove 1785). Also, at the rear end of the outer connector body 1756, there is greater clearance gap C between the outer connector body 1756 and the shell 1760 than in the assembly 1200 shown in FIG. 14. The outer connector body 1716 of the connector 1710 has a beveled outer edge 1719 at its forward end 1718.

As shown in FIG. 5, during initial mating of the connectors 1710, 1750, the inner contact 1754 of the connector 1750 engages the inner contact 1712 of the connector 1710, which provides a first "centering" action of the connector 1750. This action also causes the spring 1780 to "bottom out." As mating continues, the spring 1780 opens slightly, which causes the beveled outer edge 1719 of the outer connector body 1716 to contact the projection 1785. This interaction provides a second "centering" action to mating, which enables the clearance gap C between the rear portion of the outer connector body 1756 and the shell 1760 to be greater than in other embodiments.

Additional embodiments are disclosed and described in U.S. Patent Publication No. 2019/0312394 to Paynter, supra.

Ordinarily, the cables of these assemblies 1200, 1700 carry RF signal for transmission between pieces of electronic equipment, such as an antenna and an RRU. In one embodiment discussed in Paynter, supra, the cable 1742 of the cable connector assembly 1740 attached to the connector 1750 that is positioned in the center of the "crucifix" may be a smaller cable, and may be employed to carry calibration signals.

The inventors have recognized that ganged connector assemblies like those described above may be employed to carry Antenna Interface Standards Group (AISG) signals to an antenna. AISG is a non-profit international consortium formed by collaboration between communication infrastructure manufacturers and network operators with the purpose of maintaining and developing a standard for digital remote control and monitoring of antenna line devices in the wireless industry. The AISG protocol is based on half duplex communication and HDLC protocol. The AISG bus is a single master multi slave bus. Communication media can be either RS-485 based using a dedicated cable specified in the AISG standard or on-off key (OOK) carrier injected into the RF antenna feeder cable of a base station site. The master controlling the communication is called a primary AISG controller and the slave devices on the bus are called secondary devices or (Antenna Line Devices). The functionality of the primary AISG controller can be integrated into a base station. The primary AISG controller can also be a stand-alone controller installed at the base station or a handheld/portable controller that is typically used during the installation of a base station site. Typical types of secondary device types include remote electronic tilt (RET) units (which are typically mounted within base station antennas, tower mounted amplifiers (TMAs), geographic location sensors (GLSs) or alignment sensor devices (ASDs). The data rate for AISG communications, which was established many years ago, is prescribed at 9600 baud, which is a very low data rate compared to many of today's other devices and protocols.

Figure 6:
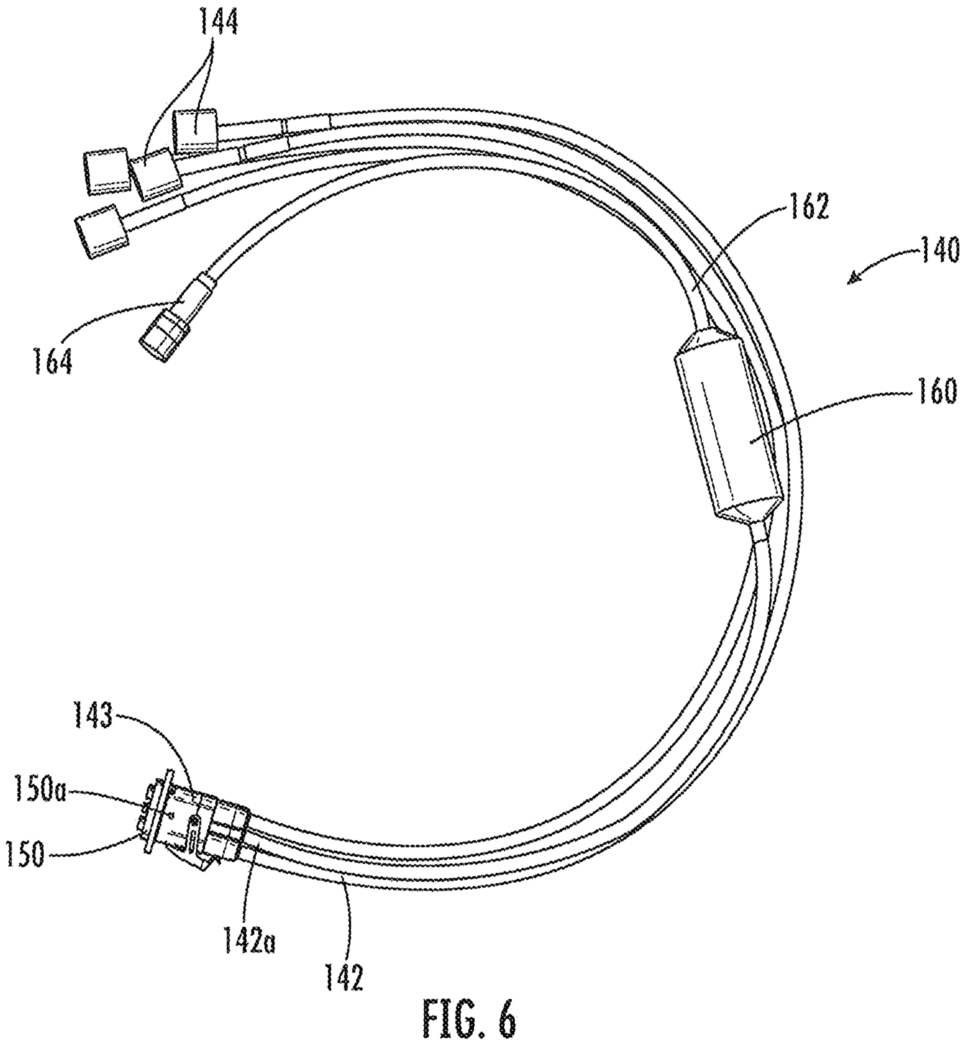
FIG. 6 is a top view of a ganged connector assembly according to embodiments of the invention.
Figure 7:
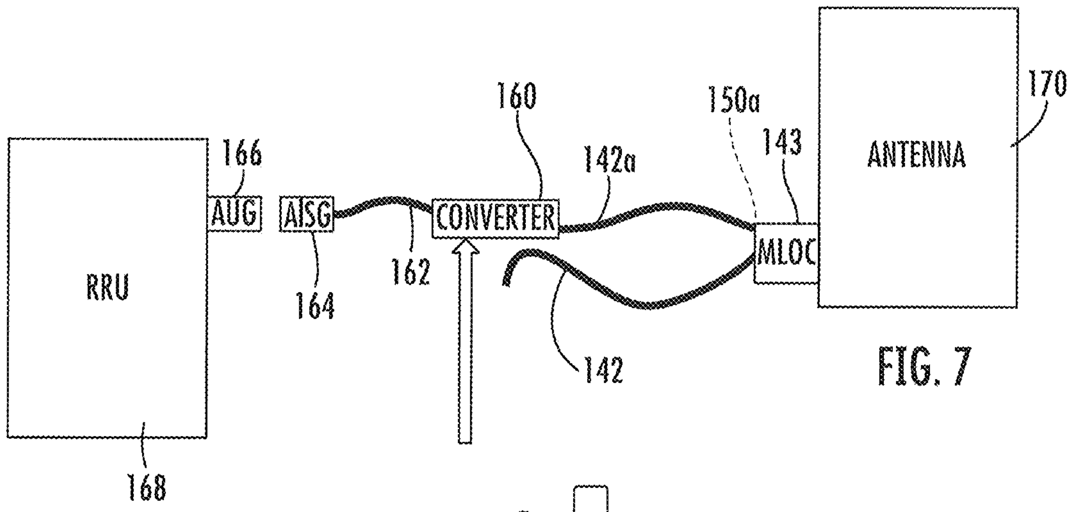
FIG. 7 is a schematic illustration of the ganged connector assembly of FIG. 6 connected between a remote radio unit (RRU) and an antenna.
Figure 8:
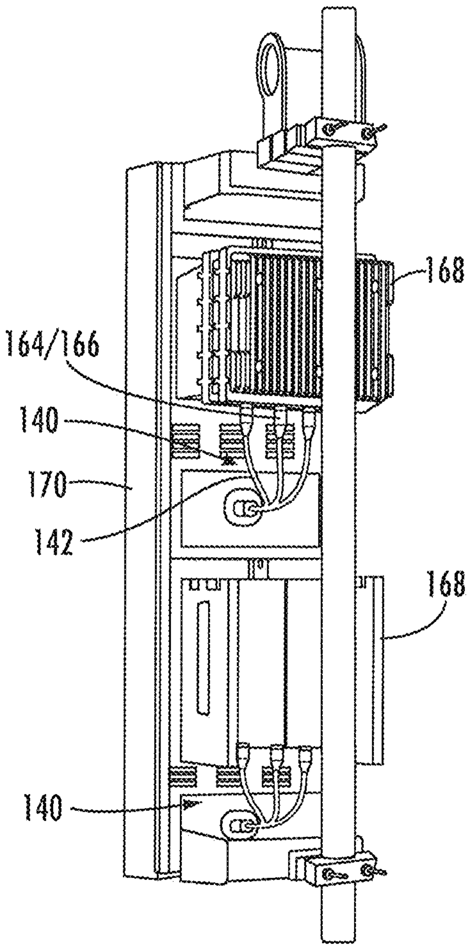
FIG. 8 is a perspective view of two ganged connector assemblies of FIG. 6 connecting respective RRUs with an antenna.

FIGS. 6-8 illustrate a ganged connector assembly 140 with five connectors 150 that are fed by five cables 142. The five connectors 150 are arranged in a cruciform pattern and are mounted in a housing 143. Four cables 142 are typical RF cables (e.g., 50 ohm coaxial cables) that are routed from the ganged connectors 150 to individual RF connectors 144 at their opposite ends. The cable 142*a* that connects with the center connector 150*a* in the "crucifix" is an RF coaxial cable suitable for carrying AISG signals (such as an FSJ1 coaxial cable, available from CommScope Technologies (Hickory, North Carolina)). As can be seen in FIGS. 6 and 7, the cable 142*a* is routed to a converter 160. The converter 160 is then routed via an AISG cable 162 to an AISG connector 164, which is configured for connection with a mating AISG connector 166 on an RRU 168.

FIG. 7 schematically illustrates the interconnections discussed above. The ganged connector assembly 140 is configured for mating with a set of five coaxial connectors mounted on an antenna 170. The cables 142 are separately to be connected to mating ports on the RRU 168 (not shown in FIG. 7, but seen best in FIG. 8). The cable 142*a* is routed from a mating port on the antenna 170 to the converter 160, and the AISG cable 162 is attached to the AISG connector 166 on the RRU 168 via the AISG connector 164. The arrangement is also illustrated in FIG. 8, wherein two RRUs 168 are connected with an antenna 170 with respective ganged connector assemblies 140.

The converter 160 may include components that enable it to convert AISG signals from the RRU 168 into readable signals that are transmitted via the cable 142*a* and connector 150*a* to the antenna 170. Such components may include a modem (e.g., an OOK modem), a power regulator, an AISG interface, and transient and surge protection devices. These components may be present in any form; for example, they may be mounted on one or more printed circuit boards located within a housing (a cylindrical housing 160*a* is shown in FIG. 6). It should also be noted that, in some embodiments, the converter 160 may be attached to or housed within the RRU 168, such that the cable 142*a* extends between the connector 150*a* and an RF port on the converter 160.

With an AISG communication path established between the RRU 168 and the antenna 170, AISG communications can then be transmitted between the RRU 168 and the antenna 170. Thus, the arrangement enables typical AISG operations, such as antenna tilt adjustment, "pinging" to check RF port connections, alarm notification, antenna information (e.g., model and serial number, band, etc.), and site data (sector, base station ID, e-tilt, etc.) to be conducted through the ganged connector assembly 140.

Figure 9:
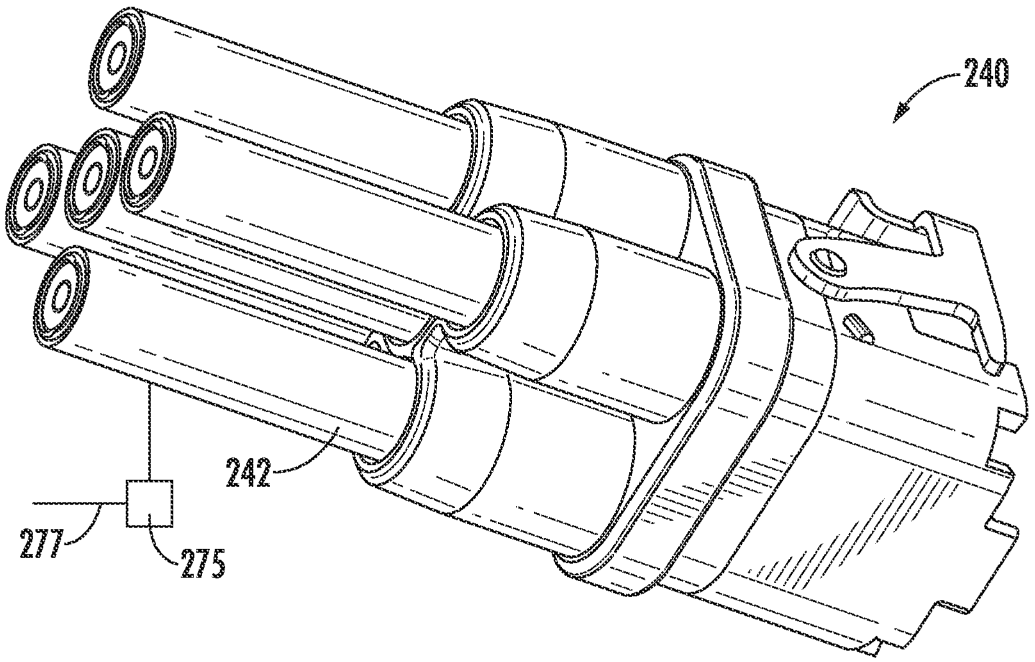
FIG. 9 is a schematic illustration of another ganged connector assembly according to embodiments of the invention.

Referring now to FIG. 9, an alternative embodiment of a ganged connector assembly is shown therein and designated at 240. This arrangement is similar to the assembly 140, but has a smart bias-T (SBT) connector 275 that is tapped into one of the RF cables 242. The SBT connector 275 is then connected to an RRU (not shown) via an AISG cable 277. This arrangement may have the advantage that the SBT connector 275 is a low passive intermodulation (PIM) component, and may be employed with a high power RF path to provide AISG signals to the connected antenna. This arrangement may enable the use of only four connectors in the ganged connector assembly 240 as shown, rather than utilizing a fifth connector for AISG signals only.

Moreover, in some embodiments a different communication protocol than AISG may be employed. Because typically the distance between an RRU and an antenna is relatively small, a much higher data rate, lower latency and higher DC power than those prescribed for AISG communications may be employed without concerns for data loss, cost, etc. Such higher performance parameters may enable the deployment and operational control of various equipment at or near the RRU and/or antenna that is not feasible with AISG data transmission protocols. Such equipment may include a camera (which typically requires a high data rate), an active GPS module (which may require commands not available in AISG), and/or an electronic mount bracket (which may have high power requirements). Other possibilities will be apparent to those of skill in this art.

Exemplary embodiments according to the present disclosure have been described in detail above with reference to the accompanying drawings. However, those skilled in the art should appreciate that a plurality of changes and modifications may be made to the exemplary embodiments of the present disclosure without departing from the spirit and scope of the present disclosure. All the changes and modifications are encompassed within the protection scope of the present disclosure as defined by the claims. The present disclosure is defined by the appended claims, and the equivalents of these claims are also contained therein.

That which is claimed is:

1. A ganged connector assembly, comprising:
- a housing,
- a plurality of first coaxial connectors mounted in the housing;
- a plurality of first coaxial cables, each attached to a respective one of the plurality of first coaxial connectors;
- a second coaxial cable electrically connected with a first one of the first coaxial connectors, the second coaxial cable configured to transmit AISG signals to the first one of the first coaxial connectors; and
- an AISG converter attached to the second coaxial cable.

2. The ganged connector assembly defined in claim 1, further comprising an AISG cable attached to the AISG converter.

3. The ganged connector assembly defined in claim 2, wherein the AISG cable has an AISG connector mounted to an end opposite the AISG converter.

4. The ganged connector assembly defined in claim 1, wherein the AISG converter is mounted in a remote radio unit (RRU).

5. The ganged connector assembly defined in claim 1, further comprising a bias-T connector connected with a first one of the plurality of first coaxial cables, wherein the second coaxial cable is connected with the bias-T connector, and wherein the first one of the first coaxial cables is connected to the first one of the first coaxial connectors.

6. The ganged connector assembly defined in claim 1, in combination with an antenna, wherein the antenna includes a plurality of second coaxial connectors, and wherein each of the plurality of second coaxial connectors is mated with a respective one of the plurality of first coaxial connectors.

7. The combination of claim 6, further comprising a remote radio unit (RRU), wherein each of the plurality of first coaxial cables is connected with the RRU, and wherein the second coaxial cable is connected with a source of AISG signals associated with the RRU.

8. A ganged connector assembly, comprising:

a housing, a plurality of first coaxial connectors mounted in the housing;

a plurality of first coaxial cables, each attached to a respective one of the plurality of first coaxial connectors;

a second coaxial cable attached to a first one of the first coaxial connectors, the second coaxial cable configured to transmit AISG signals to the first one of the first coaxial connectors; and further comprising an AISG converter attached to the second coaxial cable.

9. The ganged connector assembly defined in claim 8, further comprising an AISG cable attached to the AISG converter.

10. The ganged connector assembly defined in claim 9, wherein the AISG cable has an AISG connector mounted to an end opposite the AISG converter.

11. The ganged connector assembly defined in claim 8, wherein the AISG converter is mounted in a remote radio unit (RRU).

12. The ganged connector assembly defined in claim 8, in combination with an antenna, wherein the antenna includes a plurality of second coaxial connectors, and wherein each of the plurality of second coaxial connectors is mated with a respective one of the plurality of first coaxial connectors.

13. The combination of claim 12, further comprising a RRU, wherein each of the plurality of first coaxial cables is connected with the RRU, and wherein the second coaxial cable is connected with a source of AISG signals associated with the RRU.

* * * * *